United States Patent
Xing et al.

(10) Patent No.: US 12,433,966 B2
(45) Date of Patent: Oct. 7, 2025

(54) INTELLIGENT DISINFECTION CARPET, AND CARPET DISINFECTION METHOD AND DEVICE

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 404 days.

(21) Appl. No.: 17/018,761

(22) Filed: Sep. 11, 2020

(65) Prior Publication Data

US 2021/0361809 A1 Nov. 25, 2021

(30) Foreign Application Priority Data

May 22, 2020 (CN) .......................... 202010442925.7

(51) Int. Cl.
| | |
|---|---|
| A61L 2/24 | (2006.01) |
| A47G 27/02 | (2006.01) |
| A61L 2/16 | (2006.01) |
| G08C 17/02 | (2006.01) |
| G09G 5/36 | (2006.01) |

(52) U.S. Cl.
CPC ............ *A61L 2/24* (2013.01); *A47G 27/0243* (2013.01); *A61L 2/16* (2013.01); *G08C 17/02* (2013.01); *G09G 5/36* (2013.01); *A61L 2202/14* (2013.01); *A61L 2202/26* (2013.01)

(58) Field of Classification Search
CPC .......... A61L 2/24; A61L 2/16; A61L 2202/14; A61L 2202/26; A61L 2202/11; A61L 2202/24; A61L 2/10; A47L 23/263; A47G 27/0243; A47G 27/02; A47G 2200/226; G08C 17/02; G09G 5/36
See application file for complete search history.

(56) References Cited

U.S. PATENT DOCUMENTS

| | | | | |
|---|---|---|---|---|
| 5,820,821 | A * | 10/1998 | Kawagoe | A61L 2/08 422/186 |
| 6,668,842 | B1 * | 12/2003 | Wilke | A47L 23/02 134/119 |
| 8,241,565 | B1 * | 8/2012 | Abdul | A61L 2/10 250/455.11 |
| 8,617,464 | B2 * | 12/2013 | Kerr | A61L 2/10 422/24 |
| 9,968,238 | B2 | 5/2018 | Patel et al. | |

(Continued)

OTHER PUBLICATIONS

Extended European Search Report issued Mar. 17, 2021 in corresponding European Patent Application No. 20196887.2, 7 pages.

*Primary Examiner* — Regina M Yoo

(74) *Attorney, Agent, or Firm* — Oblon, McClelland, Maier & Neustadt, L.L.P.

(57) ABSTRACT

The present disclosure relates to an intelligent disinfection carpet, a carpet disinfection method, and a carpet disinfection device. The intelligent disinfection carpet can include a control module and a plurality of mutually independent disinfection elements. The control module is communicatively connected with the disinfection elements for controlling some or all of the plurality of mutually independent disinfection elements to release disinfection media.

4 Claims, 6 Drawing Sheets

(56) References Cited

U.S. PATENT DOCUMENTS

| | | | | |
|---|---|---|---|---|
| 10,596,280 | B1* | 3/2020 | Henderson | A61L 2/10 |
| 2009/0314308 | A1* | 12/2009 | Kim | A61L 2/0088 |
| | | | | 134/1 |
| 2010/0104470 | A1* | 4/2010 | McCabe | H05B 47/16 |
| | | | | 422/186 |
| 2010/0193709 | A1* | 8/2010 | Dalton | A61L 2/10 |
| | | | | 250/504 R |
| 2011/0286882 | A1* | 11/2011 | Wu | A61L 2/10 |
| | | | | 422/22 |
| 2012/0167325 | A1* | 7/2012 | Omidi | A47L 23/26 |
| | | | | 15/210.1 |
| 2012/0223216 | A1* | 9/2012 | Flaherty | G05D 1/0242 |
| | | | | 901/1 |
| 2012/0230867 | A1* | 9/2012 | Kerr | A61L 2/10 |
| | | | | 422/292 |
| 2013/0101461 | A1* | 4/2013 | Gil | A61L 2/10 |
| | | | | 250/455.11 |
| 2021/0316024 | A1* | 10/2021 | Green | A61L 2/24 |

* cited by examiner

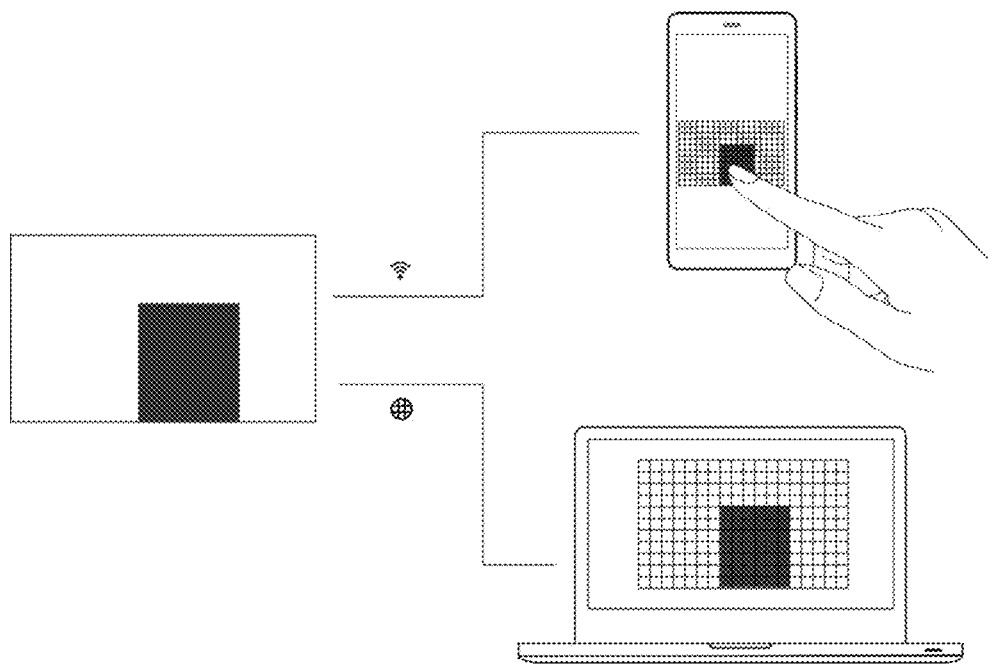

Fig. 10 marking a carpet area comprising a disinfection element corresponding to a pressure sensor detecting a depressing pressure in the intelligent disinfection carpet, in response to the depressing pressure detected by the pressure sensor of the disinfection element in the intelligent disinfection carpet — 111 determining an area comprising the marked carpet area in the intelligent disinfection carpet as the disinfection area — 112

Fig. 11

INTELLIGENT DISINFECTION CARPET, AND CARPET DISINFECTION METHOD AND DEVICE

CROSS-REFERENCE TO RELATED APPLICATIONS

This application claims priority to and benefits of Chinese Patent Application Serial No. 202010442925.7, filed on May 22, 2020, the entire content of which is incorporated herein by reference.

TECHNICAL FIELD

The present disclosure generally relates to a field of household supplies, including to an intelligent disinfection carpet, a carpet disinfection method, and a carpet disinfection device.

BACKGROUND

Carpets have become increasingly popular, which may not only keep the floor clean, but also be elastic and soft, and prevent persons from being scratched, thus being capable of imparting comfortable feelings to persons. However, bacteria are usually grown on carpets.

In the related art, intelligent self-cleaning is applied to disinfect a carpet, but during the self-cleaning process of the carpet, the entire carpet needs to be sterilized and disinfected, such that some corner areas of the carpet with less user activity will be excessively disinfected, thereby wasting of resources.

SUMMARY

The present disclosure provides an intelligent disinfection carpet, a carpet disinfection method, and a carpet disinfection device.

According to a first aspect of the present disclosure, there is provided an intelligent disinfection carpet, which includes a control module and a plurality of mutually independent disinfection elements. The control module is communicatively connected with the disinfection elements for controlling some or all of the plurality of mutually independent disinfection elements to release disinfection media.

According to a second aspect of the present disclosure, there is provided a carpet disinfection method, applied to the intelligent disinfection carpet in the first aspect and any one of the above-mentioned embodiments thereof. The method can include determining a disinfection area in the intelligent disinfection carpet, and controlling a disinfection element in the disinfection area to release disinfection media and disinfecting the disinfection area.

According to a third aspect of the present disclosure, there is provided a carpet disinfection device. The device can include a processor and a memory for storing instructions executable by the processor. The processor is configured to perform the carpet disinfection method in the second aspect or any one of embodiments thereof.

It is to be understood that both the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

FIG. is a schematic view illustrating an intelligent disinfection carpet according to an exemplary embodiment.

FIG. 10 is a schematic diagram illustrating a mobile terminal controlling a disinfection area in a carpet disinfection method according to an exemplary embodiment.

FIG. 11 is a flow chart illustrating a carpet disinfection method according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

According to the present disclosure, a carpet is modularized in different areas to disinfect some areas of the intelligent disinfection carpet, thereby avoiding excessive disinfection of the areas of the intelligent disinfection carpet caused by disinfecting the entire carpet.

Figure 1:
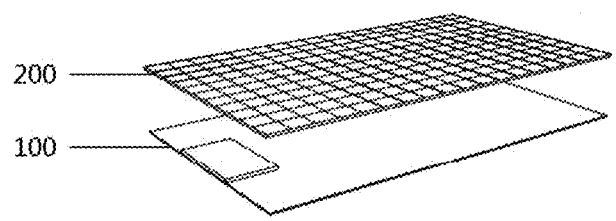

FIG. 1 is a schematic view illustrating an intelligent disinfection carpet according to an exemplary embodiment. Referring to FIG. 1, the intelligent disinfection carpet includes a control module 100 and a plurality of mutually independent disinfection elements 200, in which the control module 100 is communicatively connected with the disinfection elements 200 for controlling some or all of the plurality of mutually independent disinfection elements 200 to release disinfection media. It should be understood that one or more of the modules described in this specification can be implemented by processing circuitry.

It should be understood that the intelligent disinfection carpet is composed of a plurality of mutually independent disinfection elements 200 spliced and communicatively connected with each other. The plurality of the mutually independent disinfection elements 200 spliced with each other is communicatively connected to, and controlled by the control module 100.

The control module 100 or controller controls a designated disinfection element 200 to release disinfection media according to a disinfection control instruction to disinfect a designated area of the intelligent disinfection carpet. Alternatively, the control module 100 controls all the disinfection elements 200 to release disinfection media to disinfect the entire intelligent disinfection carpet.

In the above-mentioned intelligent disinfection carpet, due to the modularization of the carpet, the carpet is composed of a plurality of mutually independent disinfection elements 200, such that the disinfection is more flexible. When the carpet is disinfected, an area can be selected for disinfection, which can avoid excessive disinfection and reduce the waste of resources.

Figure 2:
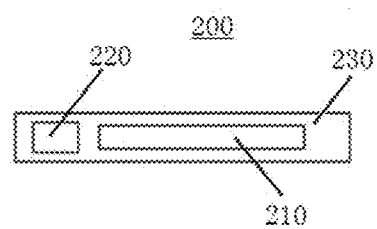
FIG. 2 is a schematic view illustrating an intelligent disinfection carpet according to an exemplary embodiment.

FIG. 2 is a schematic view illustrating an intelligent disinfection carpet according to an exemplary embodiment. Referring to FIG. 2, in an exemplary embodiment of the present disclosure, each of the disinfection elements 200 includes a mat module 230, and a disinfection component 210 and a pressure sensor 220 correspondingly arranged on the mat module 230. The disinfection component 210 and the pressure sensor 220 are communicatively connected to the control module 100, respectively.

The control module 100 is configured to control a disinfection component 210 corresponding to a pressure sensor 220 that detects a depressing pressure to release the disinfection media.

Herein, the mat module 230 or mat portion is arranged in a bottom layer of the intelligent disinfection carpet, and the control module 100 and the disinfection component 210 are arranged on the mat module 230 and communicatively connected with the mat module 230.

The control module 100 receives real-time information detected by a pressure sensor 220 on a depressing track and/or a depressing area of the intelligent disinfection carpet, and controls a disinfection component 210 corresponding to the pressure sensor 220 to release disinfection media according to the received information.

Figure 3:
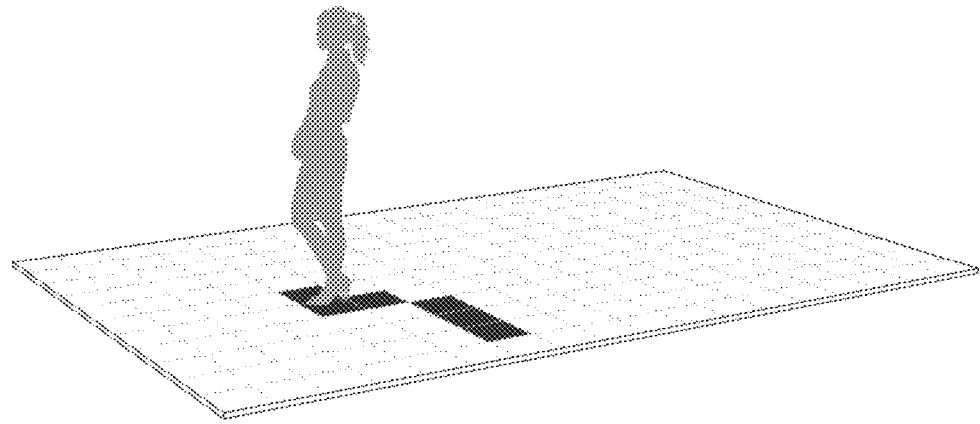
FIG. 3 is a schematic diagram illustrating a depressing track of an intelligent disinfection carpet according to an exemplary embodiment.

FIG. 3 is a schematic diagram illustrating a depressing track of an intelligent disinfection carpet according to an exemplary embodiment. Referring to FIG. 3, in an exemplary embodiment of the present disclosure, the pressure sensor 220 detects and marks a user's depressing track on the intelligent disinfection carpet in real time, and sends the depressing track information to the control module 100.

Figure 4:
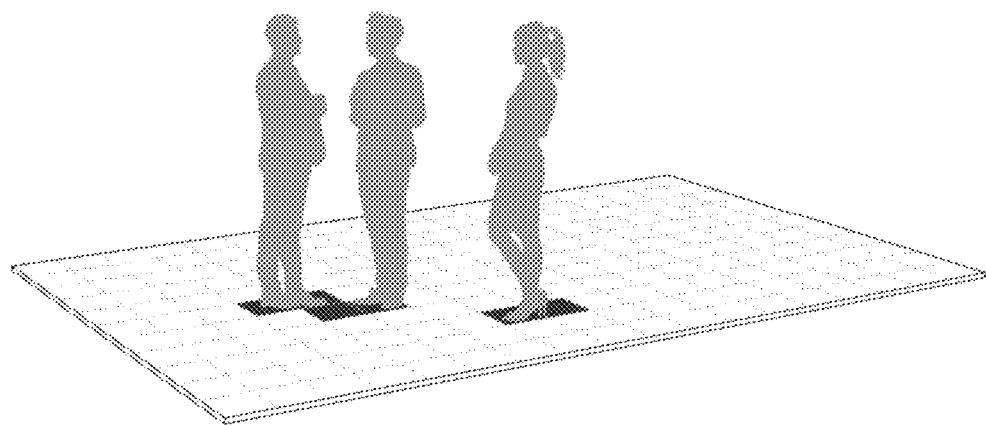
FIG. 4 is a schematic diagram illustrating a depressing area of an intelligent disinfection carpet according to an exemplary embodiment.

FIG. 4 is a schematic diagram illustrating a depressing area of an intelligent disinfection carpet according to an exemplary embodiment. Referring to FIG. 4, in an exemplary embodiment of the present disclosure, the pressure sensor 220 detects and marks a user's depressing area on the intelligent disinfection carpet in real time, and sends the depressing area information to the control module 100.

The control module 100 controls a disinfection component 210 corresponding to a pressure sensor 220 including the mark to release the disinfection media.

Figure 5:
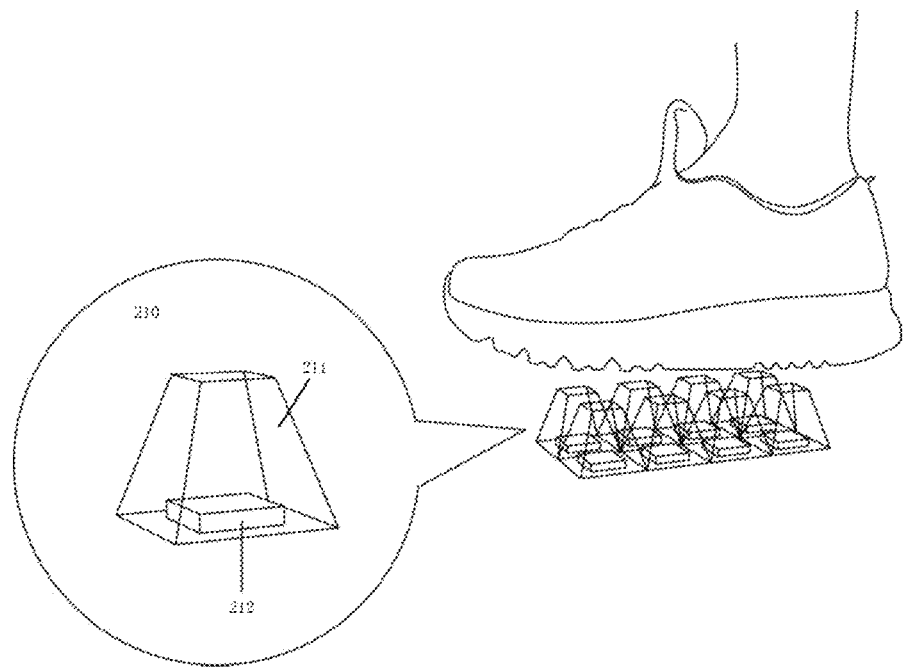
FIG. 5 is a schematic view illustrating an intelligent disinfection carpet according to an exemplary embodiment.

FIG. 5 is a schematic view illustrating an intelligent disinfection carpet according to an exemplary embodiment. Referring to FIG. 5, the disinfection component 210 includes a shell 211 and an ultraviolet lamp module 212 arranged in the shell 211.

Herein, the shell 211 is in a shape of a truncated pyramid and is hollow inside.

In the above-mentioned intelligent disinfection carpet, the shell 211 in a shape of a truncated pyramid is resistant to trampling and can better scatter ultraviolet light emitted by the ultraviolet lamp.

Figure 6:
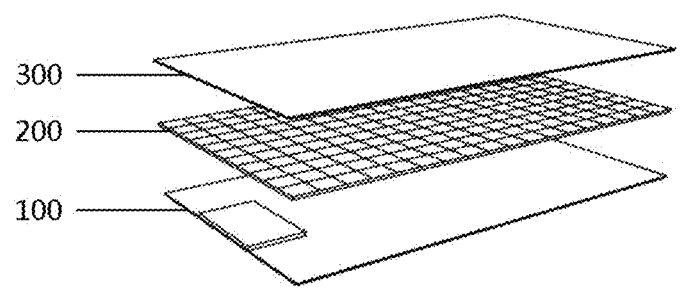
FIG. 6 is a schematic view illustrating an intelligent disinfection carpet according to an exemplary embodiment.

FIG. 6 is a schematic view illustrating an intelligent disinfection carpet according to an exemplary embodiment. Referring to FIG. 6, in an exemplary embodiment of the present disclosure, the intelligent disinfection carpet further includes a light guide module 300.

The light guide module 300 or light guide overlies a plurality of the shells 211 for guiding ultraviolet light emitted by the ultraviolet lamp modules 212.

In an exemplary embodiment of the present disclosure, the intelligent disinfection carpet further includes lighting modules 500 corresponding to the disinfection elements 200.

The lighting modules 500 or lighting components corresponding to the disinfection elements 200 are distributed in a lattice, and some of the lighting modules 500 emit light in a shape of a designated graphic under a control of the control module 100.

In an exemplary embodiment, the lighting module 500 is the ultraviolet lamp module 212, which emits ultraviolet light in a shape of a designated graphic by the ultraviolet lamp module 212.

In an exemplary embodiment, the lighting module 500 is an LED lamp corresponding to the ultraviolet lamp module 212. The control module 100 controls some of the lighting modules 500 to emit light, that is, controls the corresponding LED lamp to emit light in a shape of a designated graphic.

Figure 7:
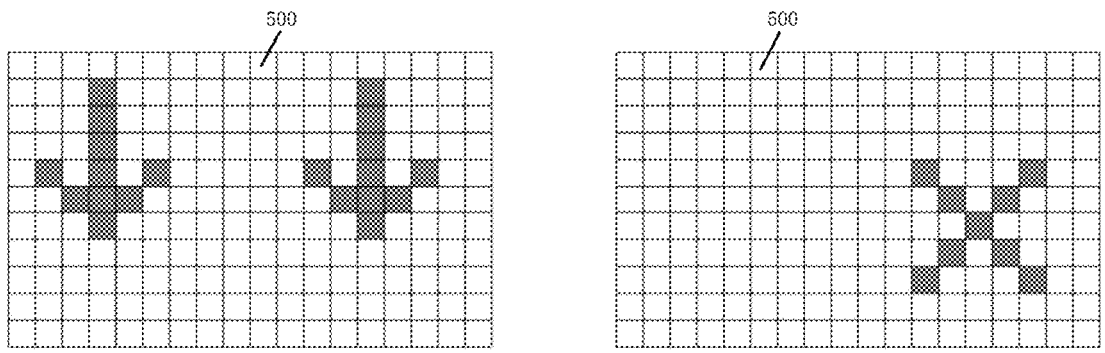
FIG. 7 is a schematic view illustrating an intelligent disinfection carpet according to an exemplary embodiment.

FIG. 7 is a schematic view illustrating an intelligent disinfection carpet according to an exemplary embodiment. Referring to FIG. 7, the designated graphic includes an arrow for dispersing a pedestrian flow, and/or an X-shaped graphic for indicating a no-entry region.

Herein, the lighting module 500 can be the ultraviolet lamp module 212 or an LED lamp, etc.

Based on the intelligent disinfection carpet in the above-mentioned embodiments, the present disclosure also provides a carpet disinfection method, which will be described in conjunction with the following embodiments.

Figure 8:
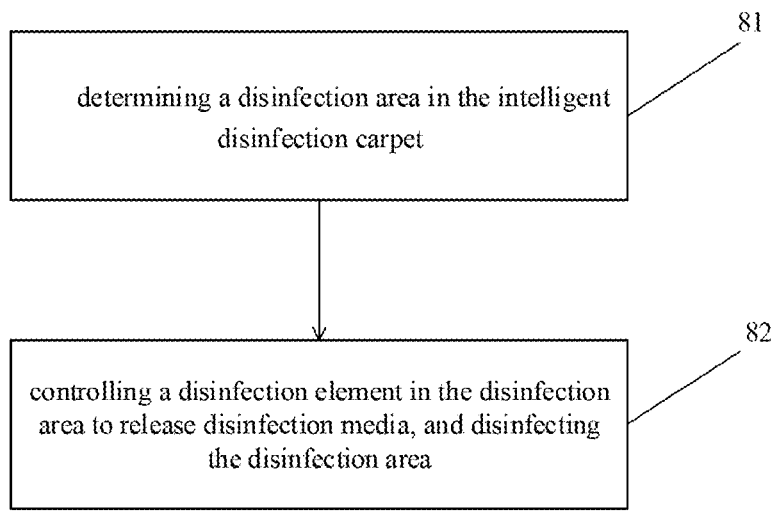
FIG. 8 is a flow chart illustrating a carpet disinfection method according to an exemplary embodiment.

FIG. 8 is a flow chart illustrating a carpet disinfection method according to an exemplary embodiment. Referring to FIG. 8, the carpet disinfection method is applied to the intelligent disinfection carpet in the above-mentioned embodiments, which includes the following steps 81 and 82.

In step 81, a disinfection area is determined in the intelligent disinfection carpet.

In step 82, a disinfection element in the disinfection area is controlled to release disinfection media, and the disinfection area is disinfected.

The intelligent disinfection carpet has been described in detail in the related embodiments, and will not be elaborated here.

A disinfection area is determined by the control module in the intelligent disinfection carpet, and a disinfection element in the determined disinfection area is controlled to release disinfection media, thereby disinfecting the determined disinfection area.

In the above-mentioned carpet disinfection method, in the process of disinfecting the carpet, the disinfection element in the disinfection area is controlled according to the determined disinfection area to perform regional disinfection, which reduces the waste of disinfection resources and makes the disinfection of intelligent disinfection carpets more targeted, thus avoiding excessive disinfection in some areas.

Figure 9:
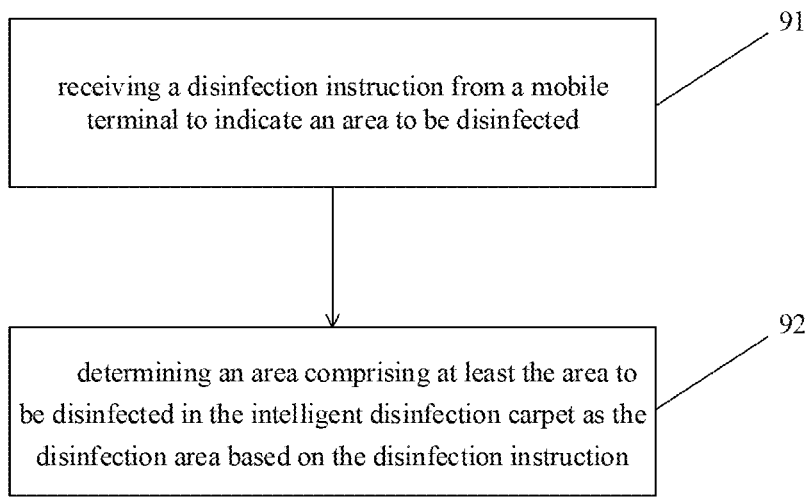
FIG. 9 is a flow chart illustrating a carpet disinfection method according to an exemplary embodiment.

FIG. 9 is a flow chart illustrating a carpet disinfection method according to an exemplary embodiment. Referring to FIG. 9, determining the disinfection area in the intelligent disinfection carpet includes steps 91 and 92.

In step 91, a disinfection instruction from a mobile terminal is received to indicate an area to be disinfected.

In step 92, a disinfection area including at least the area to be disinfected in the intelligent disinfection carpet is determined based on the disinfection instruction.

The intelligent disinfection carpet can be communicatively connected with the mobile terminal, as shown in FIG. 10. A user can remotely control the mobile terminal to determine an area to be disinfected, and the mobile terminal sends a disinfection instruction to the control module in the intelligent disinfection carpet. The control module in the intelligent disinfection carpet receives the disinfection instruction from the mobile terminal and determines the area to be disinfected as the disinfection area, or determines the area to be disinfected and a disinfection element near the area to be disinfected as the disinfection area based on the area to be disinfected.

FIG. 11 is a flow chart illustrating a carpet disinfection method according to an exemplary embodiment. Referring to FIG. 11, determining the disinfection area in the intelligent disinfection carpet includes steps 111 and 112.

In step 111, a carpet area including a disinfection element corresponding to a pressure sensor detecting a depressing pressure in the intelligent disinfection carpet is marked, in response to the depressing pressure detected by the pressure sensor of the disinfection element in the intelligent disinfection carpet.

In step 112, a disinfection area including the marked carpet area in the intelligent disinfection carpet is determined.

The pressure sensor of the disinfection element in the intelligent disinfection carpet detects a depressing status on the intelligent disinfection carpet in real time, marks the detected depressing track, and sends the depressing track information to the control module of the intelligent disinfection carpet.

In one embodiment, the pressure sensor detects a depressing status on the intelligent disinfection carpet in real time, marks the detected depressing area, and sends the depressing area information to the control module of the intelligent disinfection carpet.

The control module of the intelligent disinfection carpet receives the depressing track information and/or the depressing area information from the pressure sensor, determines a disinfection element corresponding to a pressure sensor which detects a pressure greater than a specified pressure threshold when the pressure in the received depressing track information and/or the depressing area information is greater than the specified pressure threshold, and further determines a carpet area where the disinfection element corresponding to the pressure sensor is located and an area near the carpet area as the disinfection area of the intelligent disinfection carpet. The disinfection component in the determined disinfection area is controlled to release disinfection media to disinfect the disinfection area.

In the above-mentioned carpet disinfection method, the mobile terminal can be used to remotely control the intelligent disinfection carpet for regional disinfection, or regional disinfection can be achieved based on the pressure sensor. The disinfection area is determined by intelligent sensing, and disinfected in the intelligent disinfection carpet, which can be disinfected more flexibly, thus effectively avoiding excessive disinfection.

In an exemplary embodiment of the present disclosure, since lighting modules in a lattice corresponding to the disinfection elements in the intelligent disinfection carpet is provided, when people need to be evacuated under special circumstances, the lighting modules distributed in the lattice display an arrow graphic to disperse a pedestrian flow. When the carpet or the ground is in danger or other special situations, the lighting modules distributed in the lattice display an X-shaped graphic to indicate a no-trampling region, thus avoiding dangers or other situations.

Based on the same concept, according to embodiments of the present disclosure, a carpet disinfection device is also provided.

It is understood that, in order to realize the above-mentioned functions, the carpet disinfection device provided by the embodiments of the present disclosure includes hardware structures and/or software modules corresponding to each function. In combination with units and algorithm steps of the examples disclosed in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Different methods for each specific application can be used by those skilled in the art to implement the described functions, but should not be considered as extending beyond the scope of the technical solutions of the embodiments of the present disclosure.

Figure 12:
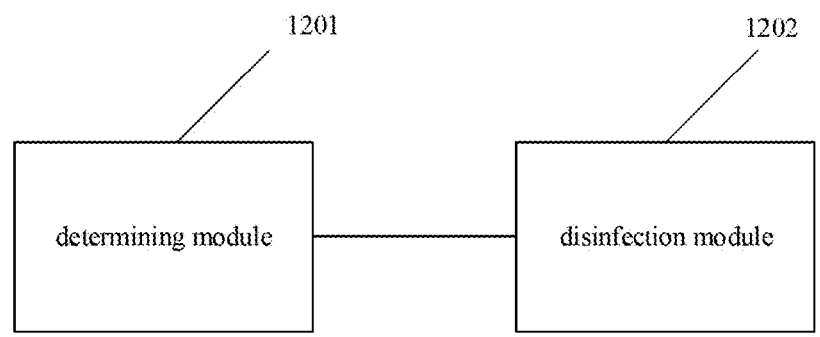
FIG. 12 is a block diagram illustrating a carpet disinfection device according to an exemplary embodiment.

FIG. 12 is a block diagram illustrating a carpet disinfection device according to an exemplary embodiment. Referring to FIG. 2, the carpet disinfection device includes a determining module 1201 and a disinfection module 1202. As described above, one or more of the modules described in this disclosure can be implemented by processing circuitry.

The determining module 1201 is configured to determine a disinfection area in the intelligent disinfection carpet. The disinfection module 1202 is configured to control a disinfection element in the disinfection area to release disinfection media, and disinfect the disinfection area.

The determining module 1201 is configured to receive a disinfection instruction from a mobile terminal to indicate an area to be disinfected, and determined an area including at least the area to be disinfected in the intelligent disinfection carpet as the disinfection area based on the disinfection instruction.

In an exemplary embodiment of the present disclosure, the determining module 1201 is configured to mark a carpet area including a disinfection element corresponding to a pressure sensor detecting a depressing pressure in the intelligent disinfection carpet in response to the depressing pressure detected by the pressure sensor of the disinfection element in the intelligent disinfection carpet, and determine an area including the marked carpet area in the intelligent disinfection carpet as the disinfection area.

In an exemplary embodiment of the present disclosure, the determining module 1201 can determine the carpet area by marking a carpet area including a disinfection element corresponding to a pressure sensor detecting a depressing pressure greater than a specified pressure threshold in the intelligent disinfection carpet.

Figure 13:
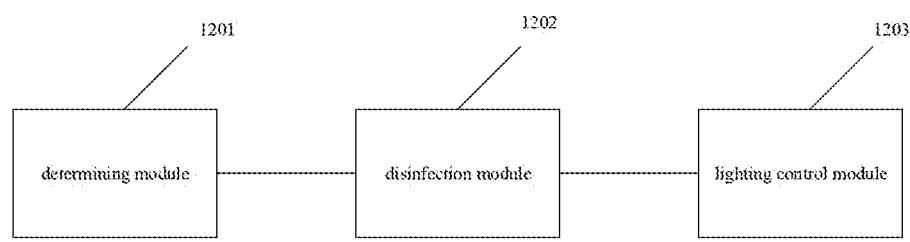
FIG. 13 is a block diagram illustrating another carpet disinfection device according to an exemplary embodiment.

FIG. 13 is a block diagram illustrating a carpet disinfection device according to an exemplary embodiment.

In an exemplary embodiment of the present disclosure, the carpet disinfection device further includes a lighting control module 1203, which is configured to control some of the lighting modules distributed in a lattice to emit light in a shape of a designated graphic.

Herein, the designated graphic includes an arrow for dispersing a pedestrian flow, and/or an X-shaped graphic for indicating a no-entry region.

With respect to the devices in the above embodiments, the specific manners for performing operations for individual modules therein have been described in detail in the embodiments regarding the methods, which will not be elaborated herein.

Figure 14:
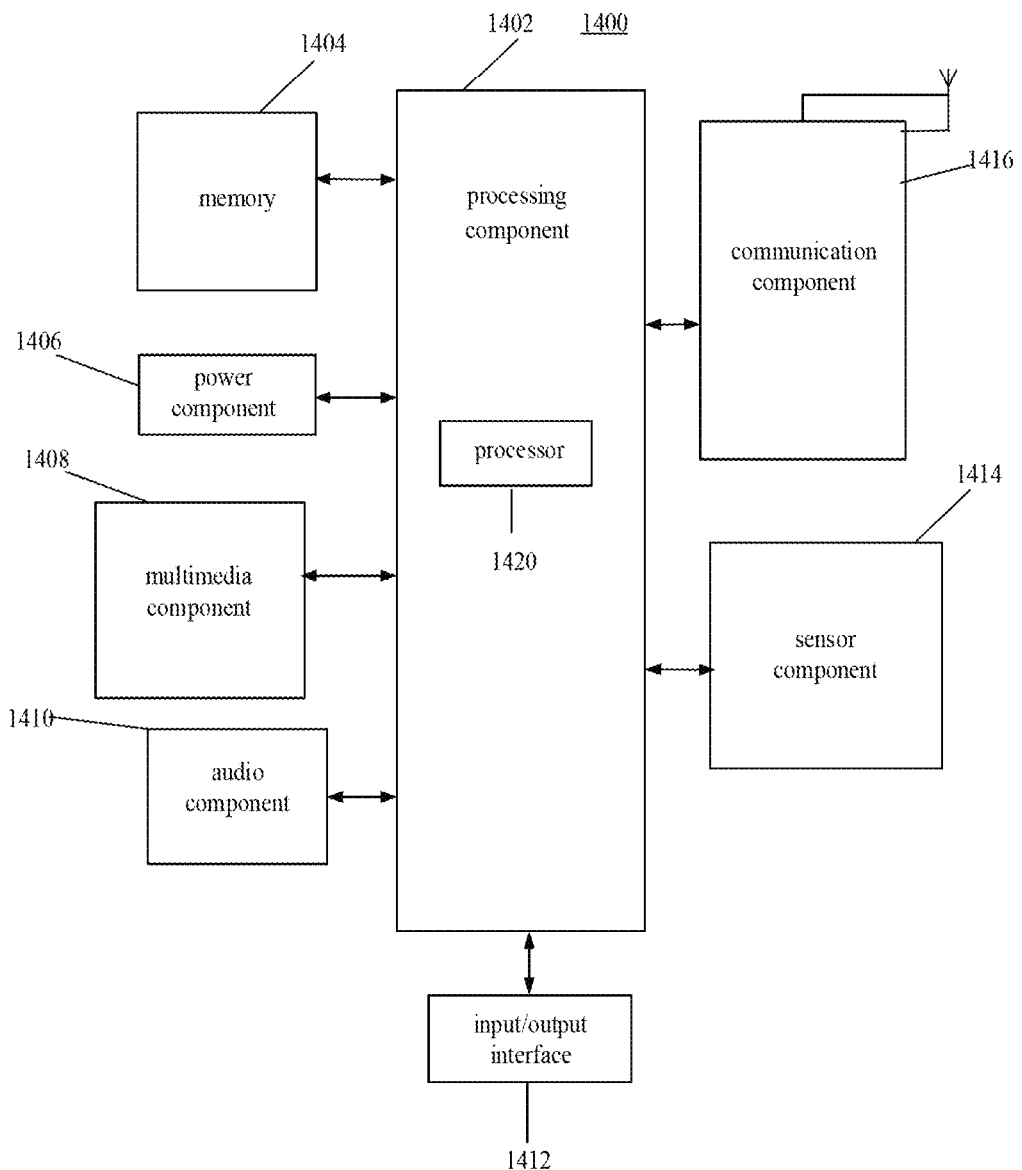
FIG. 14 is a block diagram illustrating a carpet disinfection device according to an exemplary embodiment.

FIG. 14 is a block diagram illustrating a carpet disinfection device 1400 according to an exemplary embodiment. For example, the device 1400 may be a mobile phone, a computer, a digital broadcasting terminal, a messaging device, a game console, a tablet device, a medical device, a fitness device, and a personal digital assistant, etc.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 generally controls the overall operations of the device 1400, such as operations associated with display, telephone calls, data communications, camera operations, and recording operations. The processing component 1402 may include one or more processors 1420 to execute instructions to perform all or part of the steps of the above described method. In addition, the processing component 1402 may include one or more modules to facilitate the interaction between the processing component 1402 and other components. For example, the processing component 1402 may include a multimedia module to facilitate the interaction between the multimedia component 1408 and the processing component 1402.

The memory 1404 is configured to store various types of data to support the operation of the device 1400. Examples of these data include instructions for any application or method operating on the device 1400, e.g., contact data, phonebook data, messages, pictures, videos, etc. The memory 1404 can be implemented by any type of volatile or non-volatile storage devices or combinations thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1406 provides power to various components of the device 1400. The power components 1406 may include a power management system, one or more power sources, and other components associated with the generation, management, and distribution of power in the device 1400.

The multimedia component 1408 includes a screen that provides an output interface between the device 1400 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of a touch or slide action, but also detect the duration and pressure related to the touch or slide action. In some embodiments, the multimedia component 1408 includes a front camera and/or a rear camera. When the device 1400 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 1410 is configured to output and/or input audio signals. For example, the audio component 1410 includes a microphone (MIC). When the device 1400 is in an operation mode, such as a call mode, a recording mode, and a voice recognition mode, the microphone is configured to receive external audio signals. The received audio signal may be further stored in the memory 1404 or transmitted via the communication component 1416. In some embodiments, the audio component 1410 further includes a speaker for outputting audio signals.

The I/O interface 1412 provides an interface between the processing component 1402 and a peripheral interface module. The peripheral interface module may be a keyboard, a click wheel, a button, etc. These buttons may include, but are not limited to, a home button, a volume button, a start button, and a lock button.

The sensor component 1414 includes one or more sensors for providing the device 1400 with status assessment in various aspects. For example, the sensor component 1414 can detect the on/off status of the device 1400 and the relative positioning of components, for example, the display and the keypad of the device 1400. The sensor component 1414 can also detect the position change of the device 1400 or a component of the device 1400, the presence or absence of contact between the user and the device 1400, the orientation or acceleration/deceleration of the device 1400, and the temperature change of the device 1400. The sensor component 1414 may include a proximity sensor configured to detect the presence of nearby objects without physical contact. The sensor component 1414 may also include a light sensor, such as a CMOS or CCD image sensor, for imaging applications. In some embodiments, the sensor component 1414 may also include an acceleration sensor, a gyroscope sensor, a magnetic sensor, a pressure sensor, or a temperature sensor.

The communication component 1416 is configured to facilitate wired or wireless communication between the device 1400 and other devices. The device 1400 can access a wireless network based on any communication standard, such as WiFi, 2G, or 3G, or a combination thereof. In an exemplary embodiment, the communication component 1416 receives a broadcast signal or broadcast related information from an external broadcast management system via a broadcast channel. In an exemplary embodiment, the communication component 1416 further includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth (BT) technology and other technologies.

In an exemplary embodiment, the device 1400 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components, which are configured to perform the above methods.

In an exemplary embodiment, a non-transitory computer-readable storage medium having stored therein instructions is also provided, such as a memory 1404 including instructions, which may be executed by the processor 1420 of the device 1400 to perform the above method. For example, the non-transitory computer-readable storage medium may be a read-only memory (ROM), a random access memory (RAM), a compact disc read-only memory (CD-ROM), a magnetic tape, a floppy disk, an optical data storage device, and the like.

It can be further understood that in the present disclosure, "a plurality" refers to two or more, and other quantifiers are similar. "And/or" describes the association relationship of associated objects, which indicates three types of relationships, for example, A and/or B, which can mean that: A exists alone, A and B exist at the same time, and B exists alone. The character "I" generally indicates that the associated objects are in an "or" relationship. The singular "a", "said" and "the" are also intended to include plural forms, unless the context clearly indicates other meanings.

It can be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the present disclosure, the first information may also be referred to as second information, and similarly, the second information may also be referred to as first information.

It can be further understood that although the operations in the embodiments of the present disclosure are described in a specific order in the drawings, they should not be understood as requiring these operations to be performed in the specific order shown or in a serial order, or requiring to perform all the operations shown to get the desired result. In certain circumstances, multitasking and parallel processing may be advantageous.

This disclosure is intended to cover any variations, uses, or adaptive changes of the exemplary embodiments described in the present disclosure, which follow the general principles of the present disclosure and include common knowledge or conventional methods in the technical field not disclosed in the present disclosure. The description and the embodiments are to be regarded as exemplary only, and the true scope and spirit of the present disclosure are specified by the following claims.

It should be understood that the present disclosure is not limited to the precise structure that has been described above and shown in the drawings, and various modifications and changes can be made without departing from its scope. The scope of the present disclosure is limited only by the appended claims.

What is claimed is:

1. A carpet disinfection method, comprising:
    determining a disinfection area in an intelligent disinfection carpet, wherein the intelligent disinfection carpet includes a controller and a plurality of disinfection elements that are mutually independent, and the controller is communicatively coupled with the plurality of disinfection elements for controlling at least one of the plurality of disinfection elements to release disinfection media; and
    controlling a disinfection element in the disinfection area to release disinfection media and disinfecting the disinfection area;
    wherein the determining the disinfection area in the intelligent disinfection carpet comprises:
    receiving a disinfection instruction from a mobile terminal to indicate an area to be disinfected; and
    determining an area including at least the area to be disinfected in the intelligent disinfection carpet as the disinfection area based on the disinfection instruction;
    wherein each of the plurality of disinfection elements comprises a disinfection component communicatively coupled to the controller, and the disinfection component comprises a shell and an ultraviolet lamp arranged in the shell;
    wherein a light guide overlies the shell and guides ultraviolet light emitted by the ultraviolet lamp.

2. The carpet disinfection method according to claim 1, wherein each of the plurality of disinfection elements further comprises a pressure sensor, and the determining the disinfection area in the intelligent disinfection carpet further comprises:
    when a depressing pressure is detected by a first pressure sensor of a first disinfection element in the intelligent disinfection carpet, marking a carpet area including the first disinfection element; and
    determining an area including the carpet area marked in the intelligent disinfection carpet as the disinfection area;
    wherein a first disinfection component and the first pressure sensor of the first disinfection element are communicatively coupled to the controller, and the controller is configured to selectively control the first disinfection component to release the disinfection media when the first pressure sensor detects the depressing pressure.

3. The carpet disinfection method according to claim 1, further comprising:
    controlling some of the ultraviolet lamps that are distributed in a lattice to emit light in a shape of a designated graphic.

4. The carpet disinfection method according to claim 3, wherein the designated graphic includes at least one of an arrow for dispersing a pedestrian flow and an X-shaped graphic for indicating a no-entry region.

* * * * *